(12) United States Patent
Heseding et al.

(10) Patent No.: US 12,005,885 B2
(45) Date of Patent: Jun. 11, 2024

(54) SYSTEM COMPRISING A CONTROL DEVICE FOR A UTILITY VEHICLE, AS WELL AS A METHOD FOR OPERATING A UTILITY VEHICLE WITH THE SYSTEM

(71) Applicant: WABCO GMBH, Hannover (DE)

(72) Inventors: Johannes Heseding, Hannover (DE); Gerd Schuenemann, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 742 days.

(21) Appl. No.: 17/055,142

(22) PCT Filed: May 13, 2019

(86) PCT No.: PCT/EP2019/062123
§ 371 (c)(1),
(2) Date: Nov. 13, 2020

(87) PCT Pub. No.: WO2019/219554
PCT Pub. Date: Nov. 21, 2019

(65) Prior Publication Data
US 2021/0213936 A1 Jul. 15, 2021

(30) Foreign Application Priority Data
May 15, 2018 (DE) ..................... 10 2018 111 679.9

(51) Int. Cl.
*B60W 30/02* (2012.01)
*B60W 10/06* (2006.01)
(Continued)

(52) U.S. Cl.
CPC ............ *B60W 30/02* (2013.01); *B60W 10/06* (2013.01); *B60W 10/08* (2013.01); *B60W 10/18* (2013.01);
(Continued)

(58) Field of Classification Search
CPC ...... B60W 10/06; B60W 10/08; B60W 10/18; B60W 10/30; B60W 2520/26;
(Continued)

(56) References Cited

U.S. PATENT DOCUMENTS 6,231,134 B1 5/2001 Fukasawa et al.
9,156,358 B2 10/2015 Yu et al.
(Continued)

FOREIGN PATENT DOCUMENTS

CN 101428569 A 5/2009
DE 19842472 A1 3/1999
(Continued)

*Primary Examiner* — Charles J Han
(74) *Attorney, Agent, or Firm* — LEYDIG, VOIT & MAYER, LTD.

(57) ABSTRACT

A system with a control unit for a utility vehicle includes a data port configured to receive an acceleration request signal indicating a request for an acceleration change of at least one driven axle of the utility vehicle. The control unit further includes a controller configured to produce drive control signals for an electric drive of the driven axle depending on the acceleration request signal, and brake control signals for a friction brake system of the driven axle depending on the acceleration request signal.

15 Claims, 2 Drawing Sheets

(51) Int. Cl.
*B60W 10/08* (2006.01)
*B60W 10/18* (2012.01)
*B60W 10/30* (2006.01)
*B60W 30/18* (2012.01)
*B60W 40/08* (2012.01)
*B60W 40/10* (2012.01)
*B60W 50/04* (2006.01)

(52) U.S. Cl.
CPC ...... *B60W 10/30* (2013.01); *B60W 30/18136* (2013.01); *B60W 40/08* (2013.01); *B60W 40/10* (2013.01); *B60W 50/045* (2013.01); *B60W 2520/26* (2013.01)

(58) Field of Classification Search
CPC ........... B60W 30/02; B60W 30/18136; B60W 40/08; B60W 40/10
See application file for complete search history.

(56) References Cited

U.S. PATENT DOCUMENTS

| | | |
|---|---|---|
| 2006/0000207 A1 | 1/2006 | Rush |
| 2009/0107742 A1 | 4/2009 | Schulz et al. |
| 2015/0105951 A1* | 4/2015 | Yu .............................. B60L 7/12 |
| | | 701/22 |
| 2016/0318403 A1* | 11/2016 | Nedley ................... B60L 3/108 |

FOREIGN PATENT DOCUMENTS

| | | | |
|---|---|---|---|
| DE | 102014220668 A1 | 4/2015 | |
| DE | 102017219563 A1 * | 5/2018 | ............... B60K 6/46 |
| EP | 2039577 A2 | 3/2009 | |
| EP | 2612796 A1 | 7/2013 | |
| EP | 2876007 A1 | 5/2015 | |
| WO | WO 2015106260 A1 | 7/2015 | |

* cited by examiner

SYSTEM COMPRISING A CONTROL DEVICE FOR A UTILITY VEHICLE, AS WELL AS A METHOD FOR OPERATING A UTILITY VEHICLE WITH THE SYSTEM

CROSS REFERENCE TO RELATED APPLICATIONS

This application is a U.S. National Phase Application under 35 U.S.C. § 371 of International Application No. PCT/EP2019/062123, filed on May 13, 2019, and claims benefit to German Patent Application No. DE 10 2018 111 679.9, filed on May 15, 2018. The International Application was published in German on Nov. 21, 2019, as WO 2019/219554 A1 under PCT Article 21(2).

FIELD

The present disclosure relates to the range of utility vehicles, in particular electrically or hybrid driven utility vehicles, such as trucks, which include an electric drive on the one hand and on the other hand a drive by an internal combustion engine.

BACKGROUND

Historically, such utility vehicles, which have long been known with an internal combustion engine as the drive, have been developed into hybrid vehicles as a rule. That is, utility vehicles with internal combustion engines have added an electric drive to the existing structure. Therefore, no completely new development for the provision of a hybrid utility vehicle has taken place. The control of the electric drive was therefore adapted to the existing control structure.

In the case of known utility vehicles which are hybrid-driven, an electric drive is therefore usually provided which is primarily used to support a positive acceleration generated by the internal combustion engine. In the case of purely electrically driven vehicles, the electric drive is primarily used to generate positive acceleration alone. For this purpose, such utility vehicles usually have a vehicle control unit (VCU). In the case of an acceleration, in the case of a hybrid-driven vehicle, an acceleration request, which is for example specified by an accelerator pedal position by a driver, is passed from the vehicle control unit to the internal combustion engine, which in combination with a gearbox provides a torque to the drive wheels. If necessary, the vehicle control unit switches on the electric drive to support the torque provision. The vehicle control unit also controls an electronically controlled braking system (EBS) of the vehicle in order to receive a negative acceleration request, i.e. a desired braking, and to implement it by means of a friction brake.

Here it is also known that in the case of a pre-existing electric drive for assisting braking the vehicle control unit also signals the braking request to an electric drive in order to support braking by an electromagnetic braking operation of the electric drive. In this case, electrical energy can also be recovered during a braking maneuver carried out with the electric drive.

According to the prior art, rapid acceleration changes or torque changes, which are necessary for example in the case of slip control or stability control, are carried out by the electronically controlled braking system itself and only the friction brakes are used during this. The inclusion of the electric drive is not yet possible due to a complex communication required for this purpose between the individual control units but is desirable.

SUMMARY

In an embodiment, the present invention provides a system with a control unit for a utility vehicle. The control unit includes a data port configured to receive an acceleration request signal indicating a request for an acceleration change of at least one driven axle of the utility vehicle. The control unit further includes a controller configured to produce drive control signals for an electric drive of the driven axle depending on the acceleration request signal, and brake control signals for a friction brake system of the driven axle depending on the acceleration request signal.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
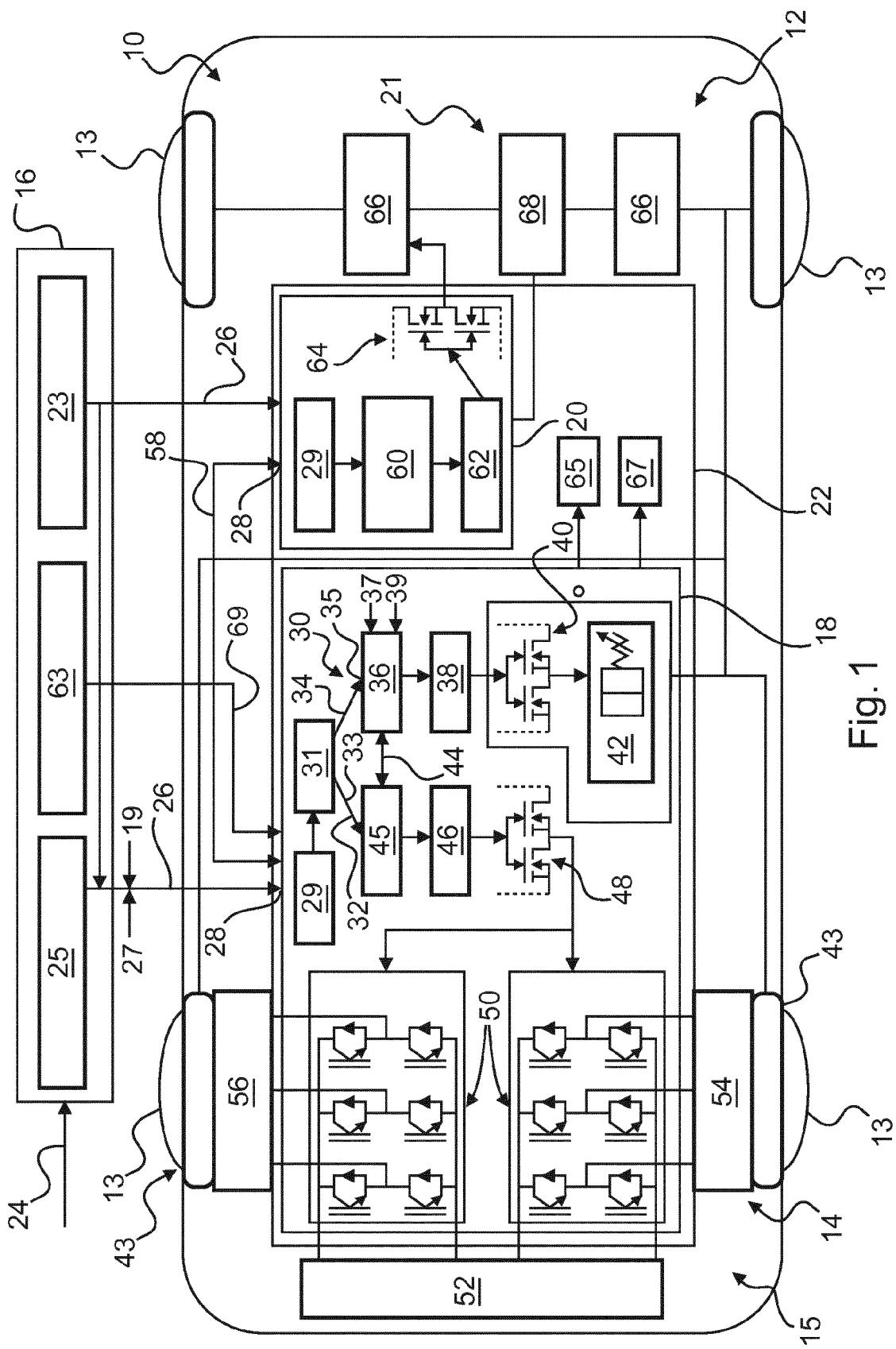
FIG. 1 shows a utility vehicle.

The present disclosure therefore finds a way to also use an electric drive in the highly dynamic position of positive and negative torque to the slip and stability control, in order to be able to use the high torque dynamics of electric drives for improved slip and stability control.

For this purpose, the present disclosure provides a system with a control unit for a utility vehicle comprising a data port, which can also be called a data input, and a control system. The utility vehicle is a truck, for example. The data input is used to receive an acceleration request signal. The acceleration request signal is for example positive or negative, so preferably has positive or negative torques. Positive torques preferably describe a drive of a vehicle and negative torques a deceleration, namely braking. The acceleration request signal indicates an acceleration change of at least one driven axle of the utility vehicle. The acceleration request signal is generated, for example, based on a pedal position changed by a driver and is fed to the control unit via the data input.

The control unit is used for generating drive control signals for an electric drive of the driven axle and at the same time for generating braking control signals for a friction brake system of the driven axle. Here, the drive control signals and the braking control signals are generated depending on the acceleration request signal.

Accordingly, a system with a separate, in particular single, control unit is provided, which, on the basis of a request for an acceleration change performs an electric drive of a driven axle on the one hand and on the other hand control of the friction brake system of the driven axle at the same time. The control unit of the system thus represents a combination of multiple control units, so that a complex and time-critical communication between the control units is no longer necessary for highly dynamic accelerator changes or torque changes. A single control unit of the system is thus able to carry out coordination between the control of an electric drive as well as the friction brake system independently of a communication with the other system.

According to a first embodiment, the control unit has a torque-sharing distribution for producing at least one target torque value as a drive control signal for the electric drive and at least one target torque value as a brake control signal for the friction brake system, each based on an acceleration request signal. Accordingly, the system is set up to output an acceleration signal, which is negative for example, individually in braking with the electric drive by providing a target torque value as a drive control signal. If the electric drive operated as an electromagnetic brake is not sufficient to carry out a desired negative acceleration, the friction brake system will be used by the controller by providing a target torque value as a brake control signal.

According to a further embodiment, the control unit is set up to receive or generate a slip signal. The slip signal here includes a slip of one or more drive wheels of at least one drive axle. If the control unit is set up according to a particular embodiment to generate the slip signal, this is determined, for example, from the difference of the revolution rate of the drive wheels detected with existing sensors and a vehicle speed, which can be specified by a vehicle control unit, for example.

In addition, the control unit is set up to generate drive control signals and braking control signals depending on the acceleration request on the one hand and depending on the slip signal on the other hand. Detected slip of the drive axle can thus also be reacted to, for example, by the integrated generation of the drive control signals and the braking control signals for slip control and stability control of the vehicle with the use of the electric drive. The electric drive can therefore also be used for energy recovery in the case of slip control or stability control maneuvers. In addition, in a case in which the electric drive includes multiple electric motors, wheel-specific interventions can be made to improve vehicle stability.

According to a further embodiment, the control unit comprises a port for a bus system. The bus system is preferably a CAN bus. The port is used to receive the acceleration request signal and/or the slip signal. Since an acceleration request signal and/or a slip signal is usually provided and/or transmitted by a vehicle control unit (VCU), a bus connection is used to receive the acceleration request signal and/or the slip signal preferably from the vehicle control unit. However, for slip control or stability control itself, communication with a vehicle control unit is no longer necessary. The vehicle control unit is thus used only to transfer a request for an acceleration change, which is negative for example, to the control unit of the system. If slip then occurs, the control unit can automatically counter this or compensate for it without communicating with the vehicle control unit. The occurrence of slip is preferably detected when a slip value of a wheel, which is determined by determining the revolution rate of the wheel and comparing the revolution rate with a vehicle speed, exceeds at least one predefined threshold value. Thus, communication via the bus system represents a simple and sufficient means of communication between the control unit of the system and the vehicle control unit.

According to a further embodiment, the control unit is set up to provide further braking signals for a friction brake system of at least one non-driven axle of the utility vehicle depending on the acceleration request signal. A non-driven axle of the utility vehicle is preferably a driveless axle, which thus has no drive. An additional electronic braking system for axles of a utility vehicle not equipped with an electric driver can therefore be dispensed with, so that no separate brake control unit has to be provided for the other non-driven axles. The number of electronic components required is made possible and a further reduction in the cost required for communication and coordination of the control units involved in the vehicle movement is achieved.

According to a further embodiment, the control unit is set up to receive an acceleration request signal including a negative acceleration request, namely a braking request, from a vehicle control system directly or via a brake control unit, which is intended in particular for a friction brake system of a non-driven axle of the vehicle.

Accordingly, if contrary to the preceding embodiment one or more brake control units (EBS) is provided in the vehicle, which perform slip control or stability control of non-driven axles, thus by receiving an acceleration request signal from these brake control systems the friction brake system as well as the electric drive of a driven axle of the vehicle may be used to support the requested braking request. A communication between the brake control unit or the brake control units and the controller takes place, for example, via a bus system, such as a CAN bus.

According to a further embodiment, the control unit is set up to receive an acceleration request signal, which includes a positive acceleration request, namely a speed increase request, directly from a vehicle control unit.

According to a further embodiment, the system has a brake control unit for the friction brake system of a non-driven axle. The brake control unit is set up to receive an acceleration request signal with a request for a negative change in acceleration, namely a braking request, from a vehicle control unit and then to send it to the control unit as a modified acceleration request signal. Thus, the control unit is then set up to generate drive control signals with a negative torque from the modified acceleration request signal. The system is thus set up to request a negative torque with the electric drive first and, in the event that the negative torque of the electric motors is not sufficient to fulfil the negative acceleration change, to generate a brake control signal for the friction brake system with the brake control unit.

First of all, it is taken into account that when braking a maximum energy recovery is carried out with an electric drive and the friction braking is used only after reaching a limit for such a braking option.

According to a further embodiment, the control unit is set up to generate individual drive control signals for multiple electric motors of an electric drive individually from the acceleration request signal, in particular also taking into account the slip signal and/or other sensor values, which indicate cornering for example. Accordingly, for example, for stability control of a vehicle electric motor of the electric drive on different sides of the vehicle can be subjected to different torques, which are represented by the different individual drive control signals. In this way, safety can be improved and increased.

According to a further embodiment, the control unit comprises multiple drivers, in particular gate drivers, such as IGBT gate drivers, for controlling valves or solenoid valves of the friction brake system with the braking control signals by means of the drivers. The drivers together preferably form a valve control unit. In addition, the system includes multiple drivers, in particular gate drivers, such as IGBT gate drivers, which are used to control at least one power amplifier of an inverter of the electric drive with the drive control signal. The drivers for controlling the power amplifier together preferably form an inverter control system for controlling a power amplifier of an inverter. The drivers for controlling the valves or solenoid valves as well as for controlling the power amplifier of the inverter are preferably of an identical design.

A power stage of the control unit, comprising, for example, a valve control unit and an inverter control unit, is therefore more cost-effective and can be produced at low cost. In particular, the use of identical components makes a system design or a component design much simpler.

According to a further embodiment, the control unit comprises at least one power amplifier for at least one inverter, in particular at least one IGBT inverter. The power amplifier can be controlled by drive signals via the inverter control unit in order to provide energy of an energy store for supplying at least one electric motor of the electric drive. Further integration of the power amplifier into the control unit further reduces the integration effort for the present system and further reduces communication with external components.

According to a further embodiment, the control unit comprises at least one valve, preferably at least one solenoid valve. The valve is, for example, an anti-lock system valve, namely an ABS valve. The at least one valve can be controlled by the brake control signal, in particular by means of a driver of the control unit. This further increases integration and further reduces communication.

According to a further embodiment, the control unit is set up, in the case of an acceleration request signal indicating a positive acceleration change and on detecting a slip value above the predefined threshold value, to reduce the target torque value of the drive control signal and to generate a braking control signal with a braking request for a friction brake system of the driven axle. Drive slip control is thus possible.

According to a further embodiment, the system comprises a slip control circuit integrated into the control unit, such as an anti-lock system (ABS) or a drive slip controller (ASR), and/or an integrated stability control circuit, such as an electronic stability program (ESP, ESC), in particular for the driven axle.

According to a further embodiment, the control unit is set up to switch the electric drive into a generator mode in the case of a negative target torque value of a drive control signal, which preferably results from an acceleration request signal indicating a negative acceleration change. In this way, kinetic energy which can be provided by means of the drive axle can be converted into electrical energy, which is then stored in the energy store.

According to a further embodiment, the control unit is set up to receive a service braking request signal, which is generated by the vehicle control unit, and thereby to control the friction brake system. A service braking request, which indicates a driver's desire to activate the service brake, is thus implemented by the control unit.

According to a further embodiment, the control unit is set up to control an engine brake and/or a retarder of a utility vehicle. A further integration of functions into the control unit is realized in this way.

According to a further embodiment, a utility device with a vehicle control unit is provided. According to the last mentioned embodiment, the utility vehicle has at least one driven axle and at least one non-driven axle.

Furthermore, the present disclosure includes a method for operating a system according to any one of the aforementioned embodiments.

FIG. 1 shows a utility vehicle 10 with a non-driven axle 12 and a driven axle 14. The non-driven axle 12 has no drive and is a front axle here. The driven axle 14 is driven and is a rear axle here. Both axles have wheels 13. As is explained later, only an electric drive 15 is shown here, wherein the vehicle 10 can additionally comprise a drive by an internal combustion engine.

The vehicle 10 comprises a vehicle control unit 16, which can exchange data with a control unit 18 on the one hand and with a brake control unit 20 on the other hand. The control unit 18 as well as the brake control unit 20 are components of the exemplary embodiment of the system 22 which is shown here.

The vehicle control unit 16 provides acceleration request signals 26 depending on an operation by a driver 24, which are fed to the control unit 18. For this purpose, the vehicle control unit 16 delivers positive acceleration changes 25 and negative acceleration changes 23 as the acceleration request signal 26.

A communication between the vehicle control unit 16 and the control unit 18 is carried out for transmitting the acceleration request signal 26, for example, via a bus system 27. Accordingly, the control unit 18 comprises a data port 28. The data port 28 is preferably a port for a CAN bus 19 and accordingly also includes a CAN interface 29. In addition, the control unit 18 comprises a torque distribution module 31, which generates a drive signal 32 for controlling an electric drive 15 and for controlling braking control signals 34 for a friction brake system 43. The drive control signals 32 include a target torque value 33, for example, and the braking control signals 34 include a target torque value 35, for example.

The braking control signals 34 are initially fed to a slip controller 36 for the driven axle. The slip controller 36 is also fed slip values 37, which indicate the slip of each of the wheels 13, and at least one predefined threshold value 39. In the slip controller 36, an existing slip of a wheel 13 is detected if the slip value 37 of the wheel 13 is above the threshold value 39. Depending on the existence or non-existence of slip, the drive control signals 32 and the brake control signal 34 are adjusted. By means of a driver controller 38, a driver 40 is controlled depending on the brake control signal 34, which controls a valve 42 of a friction brake system 43. Depending on the drive control signals 32 as well as on slip signals 44, which are also fed together with the drive control signals 32 to a motor controller 45 by the slip controller 36, signals are generated by means of the motor controller 45 which are fed to a further driver controller 46 in order to control the driver 48. In this way, a power amplifier 50 of an inverter, in particular an IGBT inverter, is controlled to provide energy of an energy store 52 for electric motors 54, 56 of the electric drive 15, so that a desired torque results. A power amplifier 50 and driver 48 together form an inverter.

In addition, the system 22 according to this exemplary embodiment comprises the brake control unit 20. The brake control unit 20 is used to control the friction brake system 21 of the non-driven axle 12. For example, the brake control unit 20 also receives acceleration request signals 26, which are generated by the vehicle control unit 16. In this case, the acceleration request signals 26 to the brake control unit 20 are forwarded to the control unit 18 via a bus as modified acceleration request signals 58. For this purpose, the brake control unit 20 also comprises a data port 28 and a CAN interface 29, for example.

By generating its own braking control signals in the brake control unit 20 using the received acceleration request signal 26 and taking into account the slip and stability control 60, the brake control unit 20 can control the friction brake system 43, in particular valves 66, of the non-driven axle 12, by means of a driver controller 62 and a driver 64. At the same time, using the modified acceleration request signals 58 in the control unit 18, drive control signals 32 for the electric drive 15 and possibly braking control signals 34 for the friction brake system 43 of the driven axle 14 can be generated by means of the control unit 18.

The brake control unit 20 is also connected to a modulator 68 of the non-driven axle 12 for monitoring and control of the brake structure.

Furthermore, the vehicle control unit 16 is set up to generate a service braking request 63 and to send it as a service braking request signal 69 to the controller 18. This is set up to control the friction brake system 43 in order to activate a service brake on receiving this signal. In addition, an engine brake 65 and a retarder 67 are provided in the utility vehicle 10, each of which can be controlled by the control unit 18.

Furthermore, the control unit 18 is also set up, in the case of a negative target torque value 33 of a drive control signal 32, to switch the electric drive 15 into a generator mode. In this mode, kinetic energy which is transmitted via the wheels 13 to the drive axle 14 and provided by this to the electric motors 54, 56 is converted into electrical energy by the electric motors 54, 56 in order to store this in the energy store 52.

Figure 2:
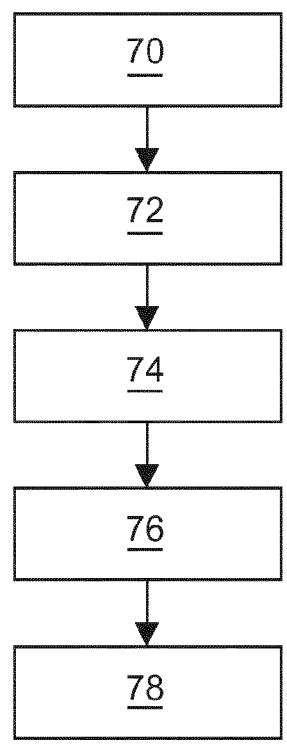
FIG. 2 shows an exemplary embodiment of the method.

FIG. 2 in an exemplary way shows steps according to an exemplary embodiment of the method. Here, in a first step 70 an acceleration signal 26 is generated by a vehicle control unit 16 and transmitted to a control unit 18 in a step 72. Drive control signals 32 and braking control signals 34 are generated in the control unit 18 in a step 74. In a step 76 at least one driver 48 of an electric drive 15 is controlled with the drive control signals 32, and in step 78 a driver of a friction brake system 43 is controlled with the brake control signal 34.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

10 Utility vehicle
12 Non-driven axle
14 Wheels
14 Driven axle
15 Electric drive
16 Vehicle control unit
18 Control unit
19 CAN bus
20 Brake control unit
21 Friction brake system of the non-driven axle
22 System
23 Negative acceleration changes
24 Operation of a driver
25 Positive acceleration changes
26 Acceleration request signals
27 Bus system
28 Data port
29 CAN-Interface
30 Controller
31 Torque distribution module
32 Drive control signals
33 Target torque value
34 Brake control signals
35 Target torque value
36 Slip controller
37 Slip values
38 Driver controller
39 Predefined threshold value
40 Driver
42 Valve
43 Friction brake system
44 Slip signals
45 Motor controller
46 Driver controller
48 Driver
50 Power stage of an inverter
52 Energy store
54, 56 Electric motors
58 Modified acceleration request signals
60 Slip and stability control
62 Driver controller
63 Service brake request
64 Driver
65 Engine brake
66 Valves
67 Retarder
68 Modulator
69 Service brake request signal
70-78 Steps of the method

What is claimed is:

1. A method for controlling slip of a utility vehicle, the method comprising:
receiving an acceleration request signal from a data port of a control unit, the acceleration request signal comprising a request for an acceleration change of at least one driven axle of the utility vehicle;
generating drive control signals that drive an electric drive of the at least one driven axle based on the acceleration request signal using a controller of the control unit:
generating brake control signals that control a friction brake system of the at least one driven axle based on the acceleration request signal using the controller of the control unit;
outputting the generated drive control signals to at least one power amplifier of an inverter of the control unit;

providing energy from an energy store that supplies at least one electric motor of the electric drive based on the drive control signals using the at least one power amplifier;

generating a slip signal using the control unit, the slip signal indicating a slip value of one or more wheels of at least one drive axle which is above a predefined threshold value: and generating the drive control signals and the braking control signals based on the acceleration request signal and the slip signal.

2. The method as claimed in claim 1, wherein the drive control signals include at least one target torque value generated by a torque distribution module of the control unit and the brake control signals include at least one target torque value generated by the torque distribution module.

3. The method as claimed in claim 1, wherein the acceleration request signal is received by a CAN bus port.

4. The method as claimed in claim 1, further comprising providing braking control signals that control a friction brake system of at least one non-driven axle of the utility vehicle based on the acceleration request signal using the control unit.

5. The method as claimed in claim 1, wherein the acceleration request signal includes a negative acceleration change received from a vehicle control unit directly or indirectly via a brake control unit, in particular a friction brake system of a non-driven axle of the vehicle.

6. The method as claimed in claim 1, wherein the acceleration request signal includes a positive acceleration change, received directly from a vehicle control unit.

7. The method as claimed in claim 1, wherein the acceleration request signal includes a request for a negative acceleration change received from a vehicle control unit, the method further comprising modifying the acceleration request signal and sending it as a modified acceleration request signal to the control unit, and generating drive control signals with a negative target torque value based on the modified acceleration request signal using the control unit.

8. The method as claimed in claim 1, comprising generating multiple drive control signals of multiple electric motors of the electric drive.

9. The method as claimed in claim 1, further comprising controlling at least one valve of the friction brake system and at least one power amplifier of an inverter of the electric drive using a plurality of identical gate drivers.

10. The method as claimed in claim 1, further comprising controlling at least one anti-lock brake system valve based on the braking control signals.

11. The method as claimed in claim 1, further comprising reducing a target torque value of the drive signal and generating a braking signal with a braking request of a friction brake system of the driven axle if the acceleration request signal includes a request for a positive acceleration change.

12. The method as claimed in claim 1, further comprising integrating an integrated slip control unit and/or an integrated stability control unit of the driven axle in the control unit.

13. The method as claimed in claim 1, further comprising switching the electric drive into a generator mode in order to generate electrical energy from kinetic energy if the drive control signals include a negative target torque value and feed the generated electrical energy into the energy store.

14. The method as claimed in claim 1, further comprising receiving a service braking request signal generated by a vehicle control unit in order to control at least one friction brake system using the control unit.

15. The method as claimed in claim 1, further comprising controlling an engine brake and/or a retarder of a utility vehicle using the control unit.

\* \* \* \* \*